United States Patent [19]

Orel

[11] 4,043,776
[45] Aug. 23, 1977

[54] SMOKE SORBING DEVICE

[76] Inventor: Jeannette V. Orel, 522 Warner Ave., Los Angeles, Calif. 90024

[21] Appl. No.: 627,125

[22] Filed: Oct. 30, 1975

Related U.S. Application Data

[63] Continuation-in-part of Ser. No. 488,229, July 15, 1974, abandoned.

[51] Int. Cl.² .............................................. B01D 50/00
[52] U.S. Cl. ................................... 55/385 G; 55/387; 55/471; 55/472; 55/473; 55/479; 55/480; 55/515; 131/238
[58] Field of Search .................... 55/385 G, 387, 439, 55/467, 473, 471, 472, 512, 513, 515–519, 356, 357, 479, 480; 131/238

[56] References Cited

U.S. PATENT DOCUMENTS

| 1,512,523 | 10/1924 | Craner | 55/356 |
|---|---|---|---|
| 1,739,372 | 12/1929 | Pirchio | 55/515 |
| 1,841,347 | 1/1932 | Tuttle | 55/357 X |
| 2,047,634 | 7/1936 | Jacobs | 55/515 X |
| 2,114,761 | 4/1938 | Crider | 55/471 |
| 2,644,467 | 7/1953 | Breidert | 131/238 |
| 2,784,465 | 3/1957 | Strobel-Fuchs | 55/482 X |
| 2,788,085 | 4/1957 | Waller | 55/385 G X |
| 3,018,841 | 1/1962 | Gerlich | 55/512 X |
| 3,163,510 | 12/1964 | Summers | 55/519 |
| 3,362,416 | 1/1968 | Jackson | 55/385 X |
| 3,490,466 | 1/1970 | Warnock | 131/238 |
| 3,516,232 | 6/1970 | Gilbertson | 55/385 |
| 3,581,748 | 6/1971 | Cameron | 55/518 X |
| 3,593,499 | 7/1971 | Kile | 55/316 X |
| 3,733,168 | 5/1973 | Marsh et al. | 131/238 X |
| 3,797,205 | 3/1974 | Weisskopf | 55/385 |
| 3,860,404 | 1/1975 | Jochimski | 55/387 X |

FOREIGN PATENT DOCUMENTS

| 172,595 | 9/1952 | Austria | 55/512 |
|---|---|---|---|
| 814,110 | 6/1937 | France | 55/519 |
| 526,790 | 8/1957 | Italy | 55/357 |
| 228,837 | 2/1925 | United Kingdom | 55/387 |

Primary Examiner—Frank W. Lutter
Assistant Examiner—Kathleen J. Prunner
Attorney, Agent, or Firm—George F. Smyth

[57] ABSTRACT

A device for filtering the smoke commonly associated with cigarettes and cigars includes an ashtray which supports a shroud for confining the smoke. The shroud in turn supports a motorized fan which creates a flow of air to carry the smoke through a filter. A motor for driving the fan is removed from the flow of air to prevent contamination of the motor by the smoke fumes. An elongated filter and a cylindrical filter are both provided with cartridge configurations to facilitate the removal and replacement of the filters. An absorbent material is impregnated with a perfume to enhance the fragrance of the flow of air through the device.

10 Claims, 9 Drawing Figures

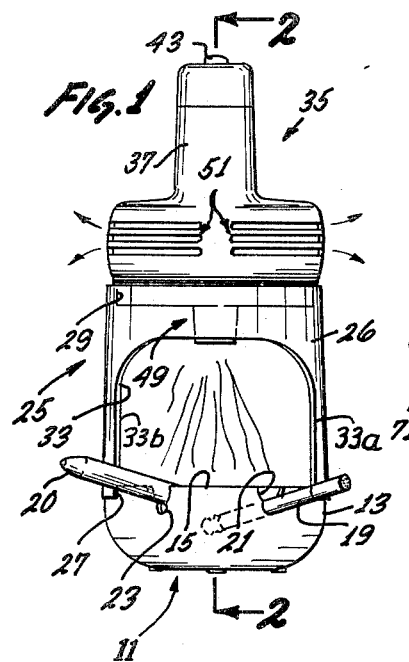

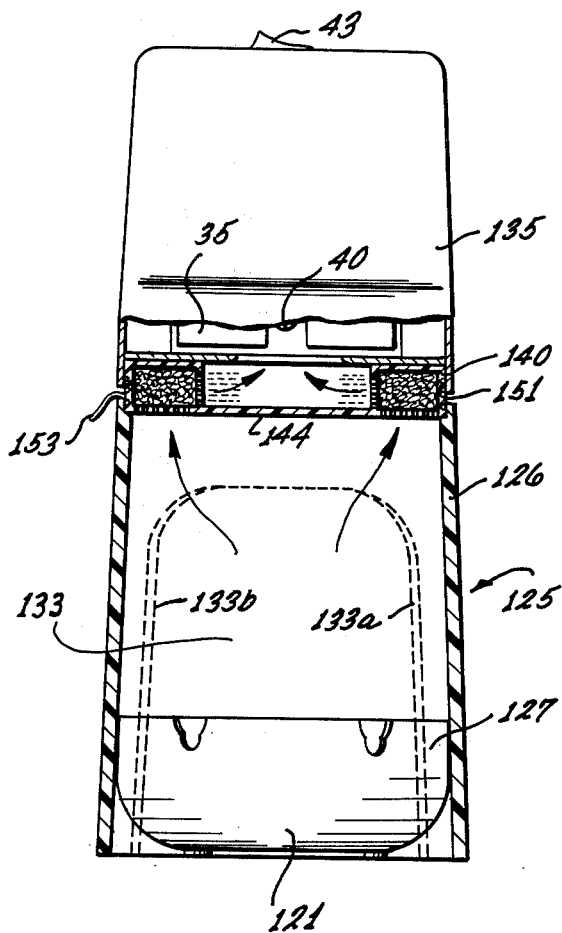
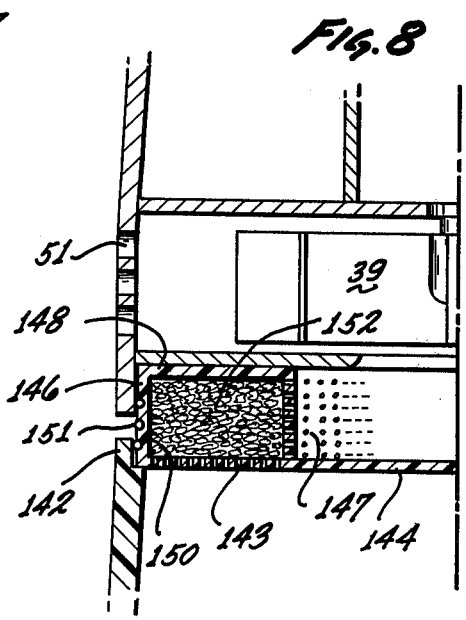
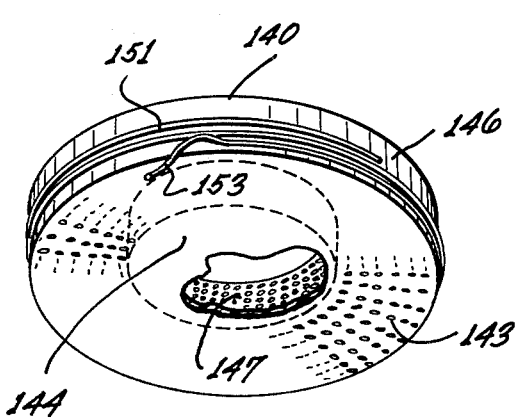

SMOKE SORBING DEVICE

RELATED APPLICATIONS

This application is a Continuation-in-Part of Application Ser. No. 488,229, filed on July 15, 1974 and now abandoned.

BACKGROUND OF THE INVENTION

1. Field of the Invention

This invention relates generally to ashtrays and more specifically to apparatus used in conjunction with ashtrays for filtering and deodorizing the smoke associated with ashtrays.

2. Description of the Prior Art

It is well known that smoke producing objects, such as cigarettes and cigars, are commonly deposited on ashtrays and the smoke from these objects tends to permeate the air of the environment and produce a disagreeable ordor. Furthermore, it is known that the smoke from these objects can be hazardous to the health of not only the person smoking the object, but also to persons who must breathe the smoke in the environment. For these reasons, it is desirable to filter and deodorize the smoke which emanates from these objects, particularly when they are deposited in an ashtray. It is also known that the smoke deposits which form on surfaces contacted by smoke, i.e., filters, build up a residue which is considered objectionable and possibly dangerous since the residue contains those same suspect chemical components as does the smoke.

Various devices have been provided for filtering the smoke of cigarettes and the like when deposited in an ashtray. Such a device is disclosed by Gilbertson in U.S. Pat. No. 3,516,232, issued on June 23, 1970. This device consists of a stand supporting an ashtray and also supporting a housing and motorized fan above the ashtray. In this device, the housing defines a passageway and the associated fan generates a flow of air through the passageway. The housing also supports a filter between the fan and the ashtray.

U.S. Pat. No. 3,490,466 discloses a smoke incinerating device in which the unburned components of tobacco smoke are incinerated so that the incinerated residue is discharged.

These devices have been particularly elaborate and therefore expensive to manufacture. In addition, they have been relatively bulky so that their size has significantly increased the normal size of an ashtray. Furthermore, the devices have not been particularly effective in filtering the smoke associated with the ashtray. The displacement of the filter from the ashtray has been of such a distance that only a small portion of the smoke has been drawn through the filter.

In some devices, a shroud has been provided to channel the smoke from the ashtray into the filter. However, even this shroud has been displaced from the ashtray so that a portion of the smoke has passed unfiltered into the environment.

The filters associated with the devices of the prior art have been relatively large providing a significant surface area transverse to the flow of air, but only a minimal thickness in the direction of the flow of air. Thus, these filters have not been particularly effective in sorbing or otherwise removing the smoke from the flow of air.

In the devices of the prior art, the fan and the associated motor for driving the fan have both been disposed within the passageway through which the smoke travels. This has had no particularly adverse effect upon the fan, but the motor has become contaminated with the smoke fumes.

SUMMARY OF THE INVENTION

In accordance with the present invention, the motorized fan draws smoke from an ashtray through a filter which sorbs and deodorizes the smoke. A shroud is provided which rests upon the upper edge of the ashtray or within which the ashtray is positioned to immediately confine the smoke emanating from the ashtray within the shroud. The shroud defines with a housing of the fan a passageway within which the filter is disposed and through which the smoke is carried by a flow of air. The shroud may be in the form of a cylinder having an opening therein to permit insertion and withdrawal of smoke producing objects from the ashtray. The shroud confines the smoke within the confines of the shroud and the opening permits entrance of fresh air into the shroud, as sucked in by a fan, to dilute the smoke with appreciable quantities of fresh air such that the smoke, diluted with fresh air is flowed through a filter device thereby assuring that the smoke does not flow out of the shroud except as it is drawn through the filter. The filter can have its longest dimensions extending in the direction of the flow of air to provide a filtering path of significant length. The motor associated with the fan can be disposed outside the passageway so that it is not contaminated by the smoke fumes.

A restricting member may be disposed between the shroud and the housing to define a major opening and a plurality of smaller openings in the passageway. The air flowing through the passageway passes through these openings. A filter cartridge having a generally elongated configuration can be disposed in the major opening to filter the smoke from the air flowing through the passageway. A sorbent material is disposed over the smaller openings and impregnated with a deodorant to provide the air flowing through the passageway with a fragrance.

In a preferred embodiment, the motorized fan has blades which provide a flow of air radially outwardly from the blades. In such an embodiment, a filter can be provided with a generally cylindrical shape and disposed circumferentially of the blades of the fan to filter the air passing through the fan.

In either embodiment, the filters include wall portions which extend generally in the direction of the flow of air between a pair of openings. Screen material can be disposed over these openings to define with the wall portions a cavity within which activated charcoal can be disposed. In the first mentioned embodiment, the wall portions of the elongated filter have a curved configuration and the screen material has a planar configuration. In the second mentioned embodiment, the wall portions of the cylindrical filter have a planar configuration and the screen material has a curved configuration. The filters, which provide an effective means for sorbing the smoke from the flow of air, are easily removable to facilitate the replacement of the filter.

In still another form of this invention, a removable filter is interposed between the shroud and the fan housing to filter the smoke before it reaches the fan blades. In this form, the filter being constructed for easy removal without the necessity of touching the filter proper and thus avoiding contact with the material accumulated on the filter.

These and other features and advantages of the invention will become more apparent with a discussion of preferred embodiments and reference to the associated drawings.

DESCRIPTION OF THE DRAWINGS

FIG. 1 is a front elevational view of a combination of a present invention including an ashtray, a shroud, and a motorized fan;

FIG. 2 is a cross-sectional view of the combination taken on line 2—2 of FIG. 1;

FIG. 3 is an expanded view in axial cross section of the filter illustrated in FIG. 2;

FIG. 4 is an expanded view of the elements associated with the motorized fan illustrated in FIG. 1;

FIG. 5 is an expanded view of one embodiment of a cylindrical filter which is particularly adapted for use with the motorized fan of the present invention;

FIG. 6 is an axial cross-sectional view of a further embodiment of the cylindrical filter of the present invention illustrating a preferred disposition of the filter within the motorized fan;

FIG. 7 is a view partly in section and partly in elevation of another form of the present invention incorporating a disposable filter element which is easy to replace;

FIG. 8 is an enlarged fragmentary view partly in section and partly in elevation of the filter mounting; and FIG. 9 is a view in perspective of the disposable filter element in accordance with this invention.

DESCRIPTION OF PREFERRED EMBODIMENTS

An ashtray is illustrated in FIG. 1 and designated by the reference numeral 11. The ashtray 11 has walls 13 which extend to an upper rim 15. This upper rim is provided with depressions 17 having a configuration particularly adapted for supporting a cigarette 19, a cigar 20, or other smoke producing object. For example, the depressions 17 can have the configuration of a portion of a larger circle 21, defined in proximity to the rim 15, and a portion of a smaller circle 23, defined beneath the larger circle 21. In a preferred embodiment, the smaller circle 23 has a diameter corresponding to the diameter of the cigarette 19, and the larger circle 21 has a diameter corresponding to the diameter of the cigar 20. Thus, the circles 21 and 23 facilitate the support of both a cigar and a cigarette by the ashtray 11.

When a smoke producing object, such as the cigarette 19, is lit, it tends to give off smoke, particularly when it is disposed in the ashtray 11 as shown in FIG. 1. If this smoke is permitted to permeate the environment of a room, for example, it can be injurious to the health of those who must breathe the smoke in the room. The smoke also tends to give off a disagreeable odor which is particularly obnoxious to a non-smoker. The device of the present invention is particularly useful in confining the smoke to a passageway inside a shroud, drawing a flow of air from the passageway through a filter to sorb the smoke, and deodorizing the flow of air prior to exhausting the air into the environment.

To facilitate the confinement of the smoke from the cigarette 19 to a restricted area, a shroud 25 can be provided to extend above the ashtray 11. In the embodiment illustrated in FIGS. 1 and 2 the shroud 25 has an elongated generally cylindrical configuration formed by wall 26 which is provided with an opening 27 at the bottom end of the shroud 25 and an opening 29 at the opposite or top end of the shroud 25. The wall 26 of the shroud 25 can have a cylindrical or slight conical configuration as illustrated in FIGS. 1 and 2.

As shown, the wall 26 next to the bottom opening 27 is provided with a circumferential shoulder 31 to facilitate disposition of the shroud 25 directly on the rim 15 of the ashtray 11 such that a portion of the shroud contacts the wall 13 of the ashtray. This direct contact between the wall 26 and the ashtray 11 is particularly desirable to maintain the smoke from the cigarette 19 within the confines of the shroud. A side or mouth 33, is provided in wall 26 to extend along the side of the shroud 25 generally above the opening 27 and the rim 15 of the ashtray 11. This mouth 33 provides access to the ashtray 11 to facilitate the removal and replacement of the cigarette 19. It will be apparent that the shroud 25 and ashtray 11 can be made as a single unit.

As shown, the mouth or opening 33 extends above the ashtray to near the top opening 29 to provide a substantial opening in the axial direction. Circumferentially there is also a substantial opening with the side walls 33a and 33b of the opening being recessed back, as shown in FIGS. 1 and 2, in chordal relation across the ashtray to provide easy access to the ashtray. In this way, the shroud surrounds a substantial portion of the ashtray to form an enclosure, while the walls 33a and 33b are recessed back thus exposing a substantial portion of the rim of the ashtray which extends beyond the side walls 33a and 33b of the shroud mouth. Also, the opening is of a substantial size both in transverse and axial dimension so that a substantial volume of fresh air may be drawn into the shroud to assure that the smoke remains within the confines of the shroud. With an opening of substantial size, easy access is provided to the ashtray without the necessity of having to insert the cigarette or cigar through a small opening.

An air moving means, such as a motorized fan 35, is supported by the shroud 25 above the ashtray 11. In such an embodiment, the shroud 25 provides a cavity 95 which extends between the fan 35 and the ashtray 11. The fan 35 includes a housing 37 within which are disposed a plurality of fan blades 39 radiating from a hub 40, and a motor 41 connected to the hub 40 for driving the fan blades 39. The motor 41 is energized by the closing of a switch 43 which completes a circuit through a power source, such as a pair of batteries 45, and the motor 41.

The housing 37 includes a fan blade cavity 47 within which are disposed the fan blades 39, and an opening 49 which communicates with the cavity 47 and the cavity 95 formed by the shroud 25. The housing 37 also includes a discharge openings 51 which extend from the cavity 47 to the environment. Thus the housing 37 defines with the shroud 25 a passageway through the unit which extends from the mouth 33 in proximity to the ashtray 11, through the top opening 29 of the shroud 25, and the openings 49 and 51 in the housing 37.

One of the particularly desirable features of the present invention is the compact size of the device. This compact size is facilitated by a particularly desirable configuration for the fan 35. In the embodiment illustrated, the fan blades 39 function to provide the air in the cavity 49 with a circular flow pattern. As this air flows around the cavity 47, a centrifugal force is exerted upon the air which tends to make it move radially outwardly of the fan blades 39. This radially moving air is exhausted through the discharge openings 51 to the environment.

As the air moves through the openings 51 a partial vacuum is formed which has its greatest magnitude at the hub 40 of the fan blades 39. In response to this vacuum, a flow of air 52 moves through the mouth 33 into the cavity 95, that is the passageway defined by the shroud 25, and through the housing 37. This flow of air 52 is illustrated throughout the drawings by arrows designated with the same reference numeral 52. The flow of air 52 extends from the environment, through the mouth 33, along the passageway, and through the openings 51 to the environment. Since this flow of air 52 begins in proximity to the ashtray 11 at the mouth 33, the smoke from the cigarette 19 is carried by the flow of air 52.

Referring now to FIG. 4, it will be noted that the housing 37 includes a case 55 which supports the batteries 45, the switch 43, the motor 41 and the fan blades 39. The case 55 also includes the openings 51 which extend circumferentially of the case 55 and laterally of the fan blades 39. Within the fan blade cavity 47, the case 55 also includes axially extending keys 57 and locking pins 59.

In the embodiment illustrated, a restriction member 61 includes a radially extending base portion 63 and a plurality of keyways 65 at the circumferential edge thereof. These keyways 65 align with the keys 57 within the fan blade cavity 47. The base portion 63 extends radially inwardly and includes the opening 49, preferably at a position which is axially aligned with the hub 40 of the fan. Since the partial vacuum created by the fan has its greatest magnitude at the hub 40, this disposition of the opening 49 maximizes the velocity of the flow of air 52. The restriction member 61 can be provided with a supporting structure 67 extending circumferentially and upwardly from the base portion 63 to support a screen 69 next to the circumferential openings 51 so that air flows through the screen and out the openings.

A filter 71 is provided and cooperates with the opening 49 so that at least a portion of the air flowing through the cavity 95 passes through the filter 71. A filter support element 73, best shown in FIG. 4, includes a base portion 75 and a shoulder portion 77 extending circumferentially and axially of the base portion 75. The shoulder portion 77 extends upwardly to support the base portion 63 of the restriction member 61 as illustrated in FIG. 2.

The filter 71 may be of the type illustrated in FIG. 3. This filter 71 has generally rigid wall portions 79 which extend substantially in the direction of the flow of air 52 through the opening 49. For example, the wall portions 79 form sidewalls which can be cylindrical or may have a slight conical configuration, as illustrated in FIG. 3. A flange 81 extending radially outwardly at one end of the wall portions 79 provides a surface to which a porous member 83 may be adhered. At the opposite end of the wall portions 79, flange 85, which extends radially inwardly of the wall portions 79, provides a surface for supporting a second porous member 87 similar to member 83. Porous members 83 and 87 can be formed from any porous material such as felt, or a woven fabric, such as cloth or screen.

The wall portions 79 and the porous members 83 and 87 form a cavity which is preferably filled with activated charcoal 89 or other material for sorbing or otherwise filtering at least a portion of the smoke from the flow of air 52. In this manner, the filter 71 can be provided with a cartridge configuration which facilitates the removal and replacement of the filter 71.

The base portion 75 of the filter support element 73 extends inwardly to engage shoulders 91 which, when operatively disposed, extend generally in an axial direction into proximity with the opening 49. The filter 71 is configured to be positioned within the shoulder 91 with the outwardly extending flange 81 supported by the shoulder 91 in close proximity to the opening 49. The shoulder 91 may have a cylindrical configuraion or a slight conical configuration as illustrated in FIG. 2. The slight conical configuration may be preferred to facilitate the replacement of the filter 71. In either case, it is desirable that the wall portion 79 of the filter 71 contact the shoulder 91 along substantially its entire inner surface. This relationship ensures that the air flowing through the shoulder 91 passes through the charcoal 89.

The base portion 75 of the filter support element 73 is provided with a plurality of apertures 93 which extend between the cavity 95 of the shroud and the cavity 97 between the filter support element 73 and the restriction member 61. If, when the filter 71 is operatively positioned, there remains a clearance between the filter 71 and the opening 49, a relatively small portion of the air will flow from the cavity 95, through the holes 93, through the cavity 97, and through the opening 49. This air can be provided with a fragrance by positioning an absorbent material 99 within the cavity 97 and impregnating this material 99, for example, with a perfume. The material 99 may be a piece of felt which is supported by the base portion 75 over the holes 93. In this manner, the air being exhausted through the openings 51 to the environment, can be provided with a fragrance.

The shoulder portion 77 of the filter support element 73 is provided with keyways 101 which extend axially and radially to cooperate with the locking pins 59 in securing the restriction members 61 and the filter support element 73 to the case 55.

In another form of the invention, a filter 103 (FIG. 5) can be used either in addition to or in lieu of the filter 71. This filter 103 can be provided with a generally cylindrical configuration to facilitate disposition of the filter 103 between the fan blades 39 and the openings 51 in the cavity 47. This preferred disposition is best illustrated in FIG. 6.

The filter 103 can be constructed similar to the filter 71 with rigid portions 105 extending generally in the direction of the flow of air 52, and porous members 107 and 109 extending generally transversely to the flow of air 52. Since the flow of air 52 through the filter 103 is radially outwardly, it follows that the spaced rigid portions 105 are annular and flat and located in spaced planes while the sheet portions 107 and 109 extending between the rigid portions have a generally curved configuration, as shown. In this embodiment, the rigid portions 105 and the sheet portions 107 and 109 define a cylindrical cavity which can be filled with the activated charcoal 89.

A further embodiment of the filter 103 is illustrated in FIG. 6. In this embodiment, a first piece of porous sheet material can be bent to form an axially extending outer surface 111 and an upper surface 113 extending radially inwardly of the surface 111. Similarly, a second piece of porous sheet material can be bent to form an axially extending inner surface 115 and a bottom surface 117 extending radially outwardly of the surface 115. The surfaces 111 and 113 can be joined to the surfaces 117 and 115 respectively, to provide the filter 103 with a cylindrical cavity. This cavity can also be filled with the activated charcoal 89.

In a preferred embodiment, the filter 103 is held in position by a restriction member 104 which is similar to the base portion 63 of the restriction member 61. In the absence of the filter 71, the restriction member 104 can be appropriately configured and provided with keyways similar to the keyways 101 for registration with the locking pins 59.

In the embodiments of the filters illustrated in FIGS. 3 and 5, the rigid wall portions 79 and 105 will typically be formed from a plastic material while the porous members 83, 87, 107, and 109 can be formed from any porous material such as a felt, or a woven cloth or screen. In a preferred embodiment, the porous members 83, 87, 107 and 109 are formed from a material manufactured by E. I. DuPont de Nemours & Co. and marketed under the trademark Nylon. In the embodiment of the filter 103 illustrated in FIG. 6, it may be desirable that the pieces of sheet material forming the surfaces 111, 113, 115, and 117 be formed from wire screen to provide the filter with minimal rigidity.

The ability of the device of the present invention to reduce airborne particulate matter has been demonstrated to the extent that between 85 percent and 95 percent of airborne particulate matter was removed from filter and non-filter tip cigarettes. Moreover, by circulating air in the cavity formed by the shroud, and produced by the fan, there appears to be more complete combustion of the cigarette positioned in the ashtray and within the shroud.

Referring now to FIG. 7, a modified form of structure is illustrated and includes an ashtray 121 as already described in FIG. 1. Surrounding the ashtray 121 is a shroud 125 which is slightly conical in configuration. The shroud wall 126 contacts the opposed wall 127 of the ashtray and effectively grips the same. The shroud 125 includes a mouth or opening 133 and cooperating walls 133a and 133b, as described.

Located above the shroud and between the shroud and the fan assembly 135 is a removable filter unit 140, the latter received on a shoulder 142 provided on the upper end of the shroud and supporting the fan assembly 135, the latter provided with the fan blades 39 and openings 51, as described, and as shown in FIG. 8.

Referring to FIG. 9, the filter unit 140 is a plastic housing having an apertured lower wall 143 and an imperforate center section 144. The outer wall 146 is imperforate and spaced radially inwardly is a perforate inner wall 147, walls 143, 146 and 147 cooperating with an imperforate top wall 148 to form a filter chamber 150 containing a suitable sorbing material 152 such as activated charcoal or the like, as described.

A mixture of smoke and air is drawn through wall 143 through the filter material out through wall 147 across the fan blades and out through openings 51.

Affixed to the filter unit 140 is a string 153, as shown in FIG. 9 which is wrapped around the periphery and optionally grooves 151 may be used to seat the string, the free end of the string being outside of the shroud. As shown in FIG. 8, the string may be used to seal the outer periphery of the filter unit 140 to each of the fan housing and the shroud. To replace a filter, the fan assembly 135 is removed and the unit 140 comes off either with the fan assembly or remains on the shroud. The free end of the string is grasped and pulled to release the filter unit from that assembly with which it remains. To insert a new unit, it is placed in the housing and assembled to the shroud.

Since the filter accumulates substantial units of tar products, it is desirable to be able to replace the unit without physically having to touch it and this is an added function of the string 153 and the free end which are not in the airsmoke path.

As explained with reference to the foregoing embodiments, the device of the present invention provides means for filtering and deodorizing the smoke associated with cigarettes and cigars. The device is compact in size, inexpensively manufactured, and particularly attractive as a novelty gift item. It is also particularly functional for removing an odor from a flow of air while adding a fragrance to the flow of air.

Although the device has been disclosed with reference to specific embodiments accommodating particular filter configurations, it will be obvious that the device can be otherwise embodied so that the scope of the invention should be ascertained only with reference to the following claims.

I claim:

1. A smoke sorbing and filtering ashtray device comprising an ashtray including a wall terminating in a rim for supporting an object having a smoke producing end such as a cigar or cigarette and the like such that the smoke producing end is positioned within the ashtray, a shroud contacting the wall of the ashtray, said shroud including wall means extending above the ashtray and operative to confine within the shroud the smoke produced by the object positioned within the ashtray and including an aperture in the upper end thereof, said shroud having an opening in the wall means thereof such that the shroud contacts only a portion of the wall of the ashtray such that the smoke producing object may be inserted through the opening to rest within the ashtray, said opening defining spaced side walls of the shroud which are recessed back to expose a portion of the rim of the ashtray forward of said side walls, housing means supported solely by said shroud, said housing means having an opening generally vertically above the ashtray and said opening being in communication with said aperture, said housing means including a discharge opening spaced from said opening of said housing means and cooperating with said opening in the wall means to form a passageway extending from outside and through said shroud to the outside environment, power dri en air moving means supported within said housing means and on said shroud and positioned over said opening in said housing means and within said passageway for drawing air through the opening in the wall means of said shroud and into said passageway for discharge through the opening in said housing means through the remainder of said passageway and through the discharge opening and into the environment, the movement of air through said shroud being operative to carry with it the smoke produced by said object within the confines of the shroud, and filter means supported between said shroud and said air moving means and within said passageway for filtering the air which is discharged from said shroud through said opening by the air moving means.

2. A device as set forth in claim 1 wherein said filter means is positioned on said shroud and in communication with the passageway in said shroud and to communicate with the air moving means.

3. A device as set forth in claim 1 wherein said filter means includes means defining a chamber extending generally in the direction of the air moving in the passageway,
   said chamber including porous end walls transverse to the flow in said passageway and permitting flow into and out of said chamber, and
   means in said chamber for sorbing at least a portion of the smoke in the air flowing through said chamber.

4. A device as set forth in claim 1 wherein the filter means comprises:
   wall portions having a conical configuration and defining a larger opening and a smaller opening axially spaced from the larger opening;
   a first flange extending radially outwardly from the wall portions at the larger opening;
   a second flange extending radially inwardly from the wall portions at the smaller opening;
   a first porous member extending across the larger opening and adhered to the first flange;
   a second porous member extending across the smaller opening and adhered to the second flange, the second porous member defining with the first porous member and the wall portions a particular cavity; and
   means disposed within the particular cavity for filtering at least a portion of the air moving through the passageway to reduce the quantity of smoke in the air passing through the particular cavity.

5. A device as set forth in claim 1 wherein said filter means is positioned between said shroud and said housing means,
   said filter means including a filter housing including a plurality of walls forming a filter chamber,
   a filter material in said chamber,
   at least some of said walls being perforated for passage of air through said filter material in said chamber to said air moving means, and
   means connected to said filter housing for effecting removal of said filter housing from one of said shroud and housing means whereby the filter housing may be disposed of without manually grasping the filter housing proper.

6. A device as set forth in claim 5 wherein said means connected to said filter housing is positioned out of contact with the air flow.

7. A device as set forth in claim 1 wherein said shroud is positioned outside of said ashtray and terminates in the same plane as the base of said ashtray.

8. A device as set forth in claim 1 wherein said opening in the shroud extends below the rim of the ashtray.

9. A device as set forth in claim 1 wherein said air is discharged through the discharge opening in said housing means in a generally radial direction.

10. A device as set forth in claim 1 further including battery means positioned in said housing means for supplying power to said air moving means, and
    switch means located above said batteries for controlling the operation of said power driven air moving means.

* * * * *